United States Patent
Fujii et al.

(10) Patent No.: US 9,297,719 B2
(45) Date of Patent: Mar. 29, 2016

(54) FLIGHT CONTROL SYSTEM LOADING TEST APPARATUS AND METHOD

(71) Applicant: Honda Patents & Technologies North America, LLC, Torrance, CA (US)

(72) Inventors: Toshiaki Fujii, Tokyo (JP); Pascal Brisson, Greensboro, NC (US); Hiroshi Yamanouchi, Oak Ridge, NC (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 260 days.

(21) Appl. No.: 13/871,560

(22) Filed: Apr. 26, 2013

(65) Prior Publication Data

US 2014/0318266 A1    Oct. 30, 2014

(51) Int. Cl.
*G01M 5/00* (2006.01)

(52) U.S. Cl.
CPC ..................... *G01M 5/005* (2013.01)

(58) Field of Classification Search
CPC ............. B23Q 11/0025; H01L 21/67144; F16F 2230/0064; F16F 15/28; F16H 19/06; G01M 5/005; G01M 5/0016; G01M 9/06; Y10T 428/24628; Y10T 428/31707; Y10T 428/249988
USPC .......... 73/862.382, 865, 866.4, 802; 248/572; 428/465, 318
See application file for complete search history.

(56) References Cited

U.S. PATENT DOCUMENTS

| | | | |
|---|---|---|---|
| 2,319,675 A * | 5/1943 | Grinter | 428/174 |
| 4,481,817 A | 11/1984 | Ludowyk et al. | |
| 4,682,494 A | 7/1987 | Reed | |
| 6,112,732 A | 9/2000 | Larson | |
| 6,530,272 B2 | 3/2003 | Uchida et al. | |
| 6,871,643 B2 | 3/2005 | Cooper | |
| 6,929,222 B2 | 8/2005 | Djuric | |
| 7,677,523 B2 * | 3/2010 | Stokkermans | 248/572 |
| 7,775,120 B2 | 8/2010 | Owens et al. | |

OTHER PUBLICATIONS

International Search Report and Written Opinion of PCT/US2014/032982. dated Sep. 5, 2014, 6 pages.

* cited by examiner

*Primary Examiner* — Lisa Caputo
*Assistant Examiner* — Brandi N Hopkins
(74) *Attorney, Agent, or Firm* — Rankin, Hill & Clark LLP

(57) ABSTRACT

A flight control system loading test apparatus includes a surface-mounted sector, a cam profile sector, a dummy weight, and a cable. The surface-mounted sector attaches to an aircraft flight control system body such that the surface-mounted sector pivots along with the body about a pivot axis. The cam profile sector is configured to rotate about a rotational axis among a plurality of loading positions. The cam profile sector includes a profile surface having a plurality of curves. Each curve follows a different radius emanating from a respective axis substantially parallel to the rotational axis of the cam profile sector. The cable contacts the cam profile sector along the profile surface. An applied hinge moment using the dummy weight varies as the cam profile sector rotates about the rotational axis.

16 Claims, 7 Drawing Sheets

FLIGHT CONTROL SYSTEM LOADING TEST APPARATUS AND METHOD

BACKGROUND

This disclosure is related to a flight control system loading test apparatus and method. Entire primary flight control system components (aileron, elevator, rudder) must be exposed to limit pilot forces throughout their travel positions in accordance with U.S. federal regulations. As such, there is a need to apply a hinge moment based on the limit pilot force throughout each component's travel position. Traditional loading methods simulate a constant hinge moment. Such traditional loading methods include providing a static load test by attaching a weight, such as a sandbag, to the aileron.

Hinge moments of some primary flight control system components vary significantly throughout their travel position due to their mechanical features and limited space requirements for their mechanical systems. If the traditional loading method is applied for those primary flight control system components, excessive overload is provided to the components except for at the maximum moment range.

SUMMARY

An example of a flight control system loading test apparatus and method to simulate a variable hinge moment characteristic without applying excessive overload to the aileron control subsystem is described. An example of such a flight control system loading test apparatus includes a surface-mounted sector for attaching to a flight control system body of an aircraft, a cam profile sector operatively connected to the surface-mounted sector, and a cable connected with the cam profile sector and a dummy weight. The surface-mounted sector attaches to the flight control system body of the aircraft such that the surface-mounted sector pivots along with the flight control system body about a pivot axis as the flight control system body pivots about the pivot axis among a plurality of flight control system angles. The cam profile sector is configured to rotate about a rotational axis among a plurality of loading positions as the flight control system body pivots among the plurality of flight control system angles. The cam profile sector includes a profile surface including a plurality of successive curves. Each curve follows a different radius emanating from a respective axis substantially parallel to the rotational axis of the cam profile sector. The cable is configured to contact to the cam profile sector along the profile surface. A hinge moment applied to the flight control system body using the dummy weight varies among the plurality of loading positions to approximate a pre-calculated actual hinge moment associated with the flight control system at each of the flight control system angles.

A method for testing a hinge moment of a flight control system body of an aircraft will also be described. The method includes attaching a surface-mounted sector to the flight control system body such that the surface-mounted sector pivots along with the flight control system body about a pivot axis as the flight control system body pivots about the pivot axis through a plurality of flight control system body angle positions. The method for testing the hinge moment of the flight control system body further includes operatively connecting a cam profile sector to the surface-mounted sector such that pivoting of the surface-mounted sector results in rotation of the cam profile sector about a rotational axis through a plurality of loading positions. The method for testing the hinge moment of the flight control system body further includes attaching a dummy weight to the cam profile sector via a cable such that a different moment arm is generated between the rotational axis of the cam profile sector and a downward force applied by the dummy weight for each loading position among the plurality of loading positions. The method for testing the hinge moment of the flight control system body further includes positioning the cam profile sector in a respective loading position among the plurality of loading positions or positioning the flight control system body at a desired flight control system body angle position among the plurality of flight control system body angle positions such that the dummy weight applies a desired hinge moment on the flight control system body at a desired flight control system body angle position.

A method for defining a profile shape of a cam profile sector of a flight control system loading test apparatus includes drawing a first incircle to approximate intersection points of a cam profile section angle from a first angle to a neutral position. The method further includes drawing a first perpendicular line through a center of the first incircle to fix a center of a second incircle. The method further includes drawing the second incircle to approximate intersection points of the cam profile section angle from the neutral position to a second angle. The method further includes drawing a second perpendicular line through a center of the second incircle to fix a center of a third incircle. The method further includes drawing the third incircle to approximate intersection points of the cam profile section angle from the second angle to a third angle.

DETAILED DESCRIPTION

Figure 1:
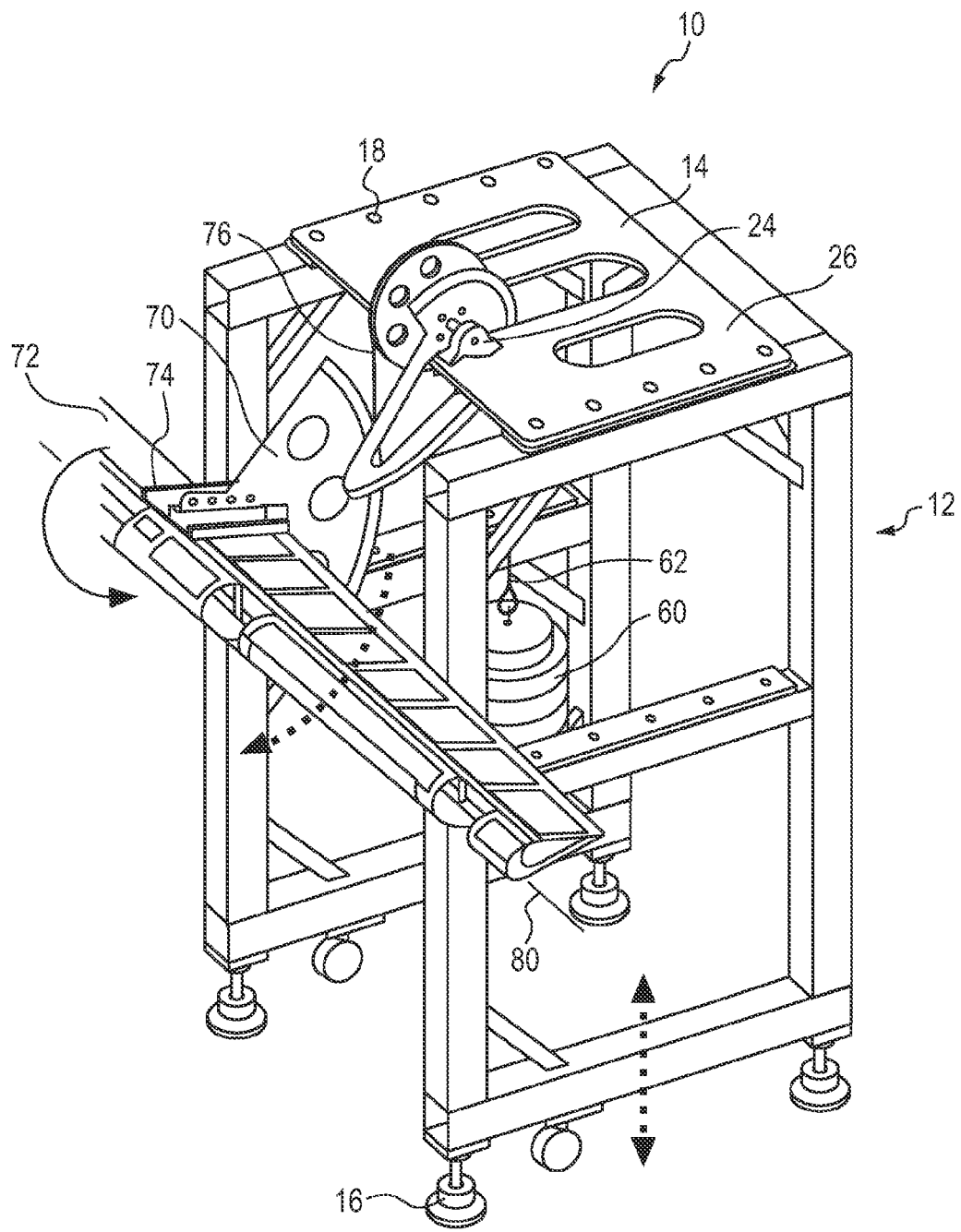
FIGS. 1 and 2 depict a flight control system loading test apparatus.
Figure 2:
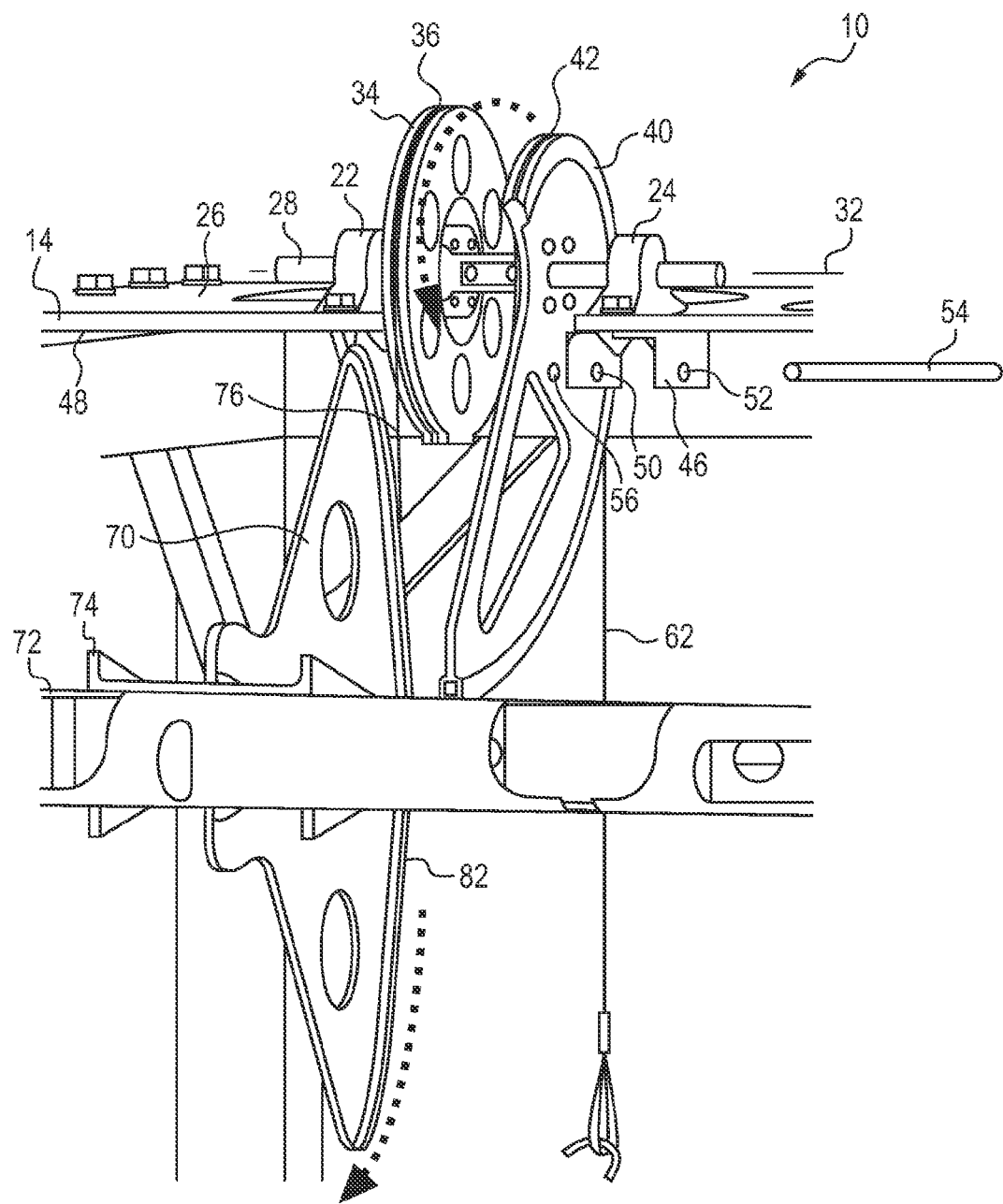

FIGS. 1 and 2 depict a flight control system loading test apparatus 10. As most clearly seen in FIG. 1, the loading test apparatus 10 includes a frame 12 that supports a base 14. Telescoping legs 16 attach to the frame 12 to allow leveling and adjustment of the frame 12 and the base 14. The base 14 is detachable from the frame 12. The depicted base 14 is a plate connected to the frame 12 by bolts 18.

With reference to FIG. 2, bearings 22, 24 mount to an upper surface 26 of the base 14. A drive shaft 28 extending through the bearings 22, 24 is configured to rotate about a rotational axis 32. A grooved disk 34 is connected to the drive shaft 28 for rotation about the rotational axis 32. The grooved disk 34 includes a peripheral groove 36, which is circular about the rotational axis 32. A cam profile sector 40 is also connected to the drive shaft 28 for rotation about the rotational axis 32. The cam profile sector 40 includes a peripheral groove 42 defining a section of a profile surface 44 (FIGS. 7 and 8), which will be described in more detail below.

A bracket 46 mounts to a lower surface 48 of the base 14. The bracket 46 includes coaxially aligned openings 50, 52 each configured to receive a rig pin 54. The cam profile sector 40 also includes an opening 56, which can be aligned with the openings 50, 52 in the bracket 46 to receive the rig pin 54. With the rig pin 54 received in the bracket openings 50, 52 and in the opening 56 of the cam profile sector 40, rotation of the cam profile sector 40 with respect to the base 14 is prohibited. The rig pin 54 is used to align the positional relationship between a flight control system body, such as an aileron 72, and the cam profile sector 40. Therefore, when a load test is performed, the rig pin 54 is removed from the openings 50, 52 and 56. With reference back to FIG. 1, a dummy weight 60 is connected to the cam profile sector via a cable 62. A traditional dummy weight can be used as the dummy weight 60.

The loading test apparatus 10 further includes a surface-mounted sector 70. The surface-mounted sector 70 is shown attached to the aileron 72 for an aircraft (which is not shown). A mounting flange 74 is fixed to a rib and spar of the aileron 72. The surface-mounted sector 70 is bolted to the mounting flange 74. A cable 76 interconnects the surface-mounted sector 70 to the grooved disk 34. The cable 76 is received in the peripheral groove 36 of the grooved disk 34. As seen in FIG. 1, the surface-mounted sector 70 is attached to the aileron 72 such that the surface-mounted sector 70 pivots along with the aileron 72 about a pivot axis 80 as the aileron 72 pivots about the pivot axis 80.

Figure 3:
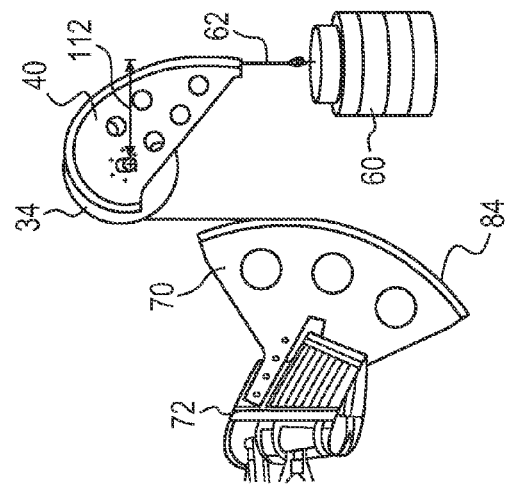
FIGS. 3-5 schematically depict the loading test apparatus of FIGS. 1 and 2 with an aileron being tested in a plurality of aileron angle positions and a cam profile sector in a plurality of loading positions.
Figure 4:
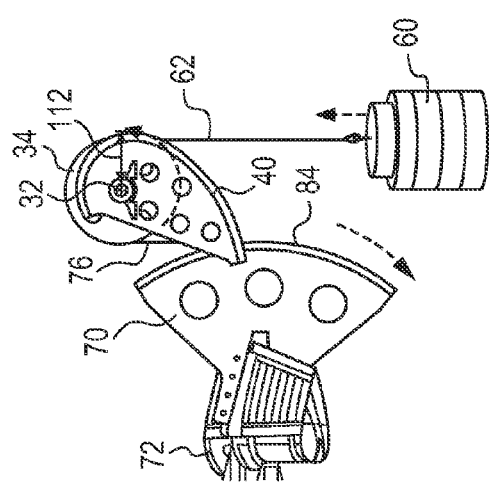
Figure 5:
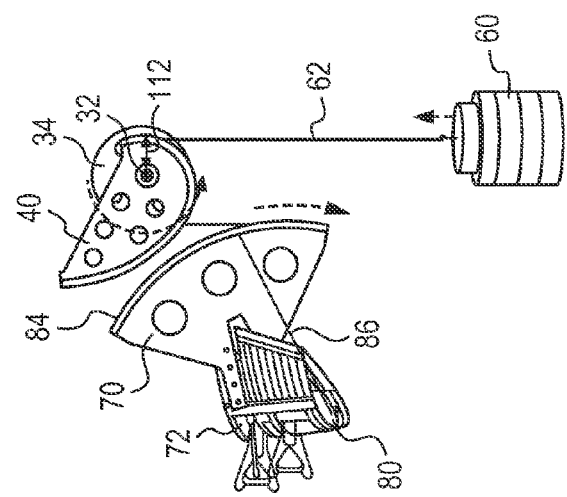

With reference to FIGS. 3-5, the aileron 72 pivots among a plurality of aileron angle positions or through a range of aileron angle positions. FIG. 3 depicts the aileron 72 in an up 25 degrees position (also referred to below as an aileron angle of −25 degrees). FIG. 4 depicts the aileron 72 in a neutral position. FIG. 5 depicts the aileron 72 in a down 17 degrees position (also referred to below as a positive aileron angle of 17 degrees). The surface-mounted sector 70 pivots along with the aileron 72 among each of the plurality (or throughout the range) of aileron angle positions.

With reference back to FIG. 2, the surface-mounted sector 70 also includes a peripheral groove 82 that cooperates with the cable 76 connecting the surface-mounted sector 70 to the grooved disk 34. Referring to FIGS. 3-5, the surface-mounted sector 70 includes a profile surface 84 defined along the center of the peripheral groove 82 and following a radius 86 (shown only in FIG. 3) emanating from the pivot axis 80 of aileron 72. The profile surface 84 on the surface-mounted sector 70 is dimensioned such that one rotation of the surface-mounted sector 70 about the pivot axis 80 results in four rotations of the grooved disk 34 and the cam profile sector 40. The profile surface 84 on the surface-mounted sector 70 can be dimensioned such that one rotation of the surface-mounted sector 70 results in x rotations of the grooved disk 34 and the cam profile sector 40, wherein x is a constant greater than one.

With continued reference to FIGS. 3-5, the cam profile sector 40 is operatively connected to the surface-mounted sector 70. In the illustrated embodiment, the cam profile sector 40 operatively connects with the surface-mounted sector 70 via the cable 76, the grooved disk 34, and the drive shaft 28. Other manners for operatively connecting the cam profile sector 40 to the surface-mounted sector 70 can be provided. The cam profile sector 40 is configured to rotate about the rotational axis 32, which is defined by the drive shaft 28, among a plurality of loading positions (see FIGS. 3-5). FIG. 3 depicts a first loading position where the cam profile sector 40 is configured to provide a minimum moment arm length. FIG. 4 depicts the cam profile sector 40 in another loading position to provide an intermediate moment arm length. FIG. 5 depicts the cam profile sector 40 in yet another loading position to provide a maximum moment arm length.

As described above, the cam profile sector 40 has a profile surface 44, which can be defined by a center line of the peripheral groove 42. A method for defining the profile surface 44 of the cam profile sector 40 will be described. The relationship between the aileron angle $\phi_{AIL}$ and the target (design) hinge moment $H_M$ can be described with the following formulas:

$$R_{CAM} = \frac{H_M \times R_{DISK}}{R_{SECTOR} \times W} = C \times \frac{H_M}{W}$$

$$\theta_{CAM} = \frac{\phi_{AIL} \times R_{SECTOR}}{R_{DISK}} = \frac{\phi_{AIL}}{C}$$

$R_{CAM}$ refers to the length of the moment arm of the pulley from which the dummy weight 60 depends. For the apparatus shown in FIG. 1, $R_{CAM}$ refers to the length of the moment arm of the cam profile sector 40. $H_M$ refers to the hinge moment applied to the aileron 72. $R_{DISK}$ refers to the radius of grooved disk 34. $R_{SECTOR}$ refers to the radius of the surface-mounted sector 70. W refers to the weight of the dummy weight 60. $\phi_{AIL}$ refers to the aileron angle measured from a neutral position, which is shown in FIG. 4. $\theta_{CAM}$ refers to the angle of the cam profile sector 40 measured from a neutral position, which is shown in FIG. 4. C refers to the ratio of $R_{DISK}/R_{SECTOR}$. Because C, the ratio of $R_{DISK}/R_{SECTOR}$, is 1:4, when the aileron angle $\phi_{AIL}$ is −25° (as shown in FIG. 3), the cam angle $\theta_{CAM}$ of the cam profile sector 40 is −100°.

Figure 6:
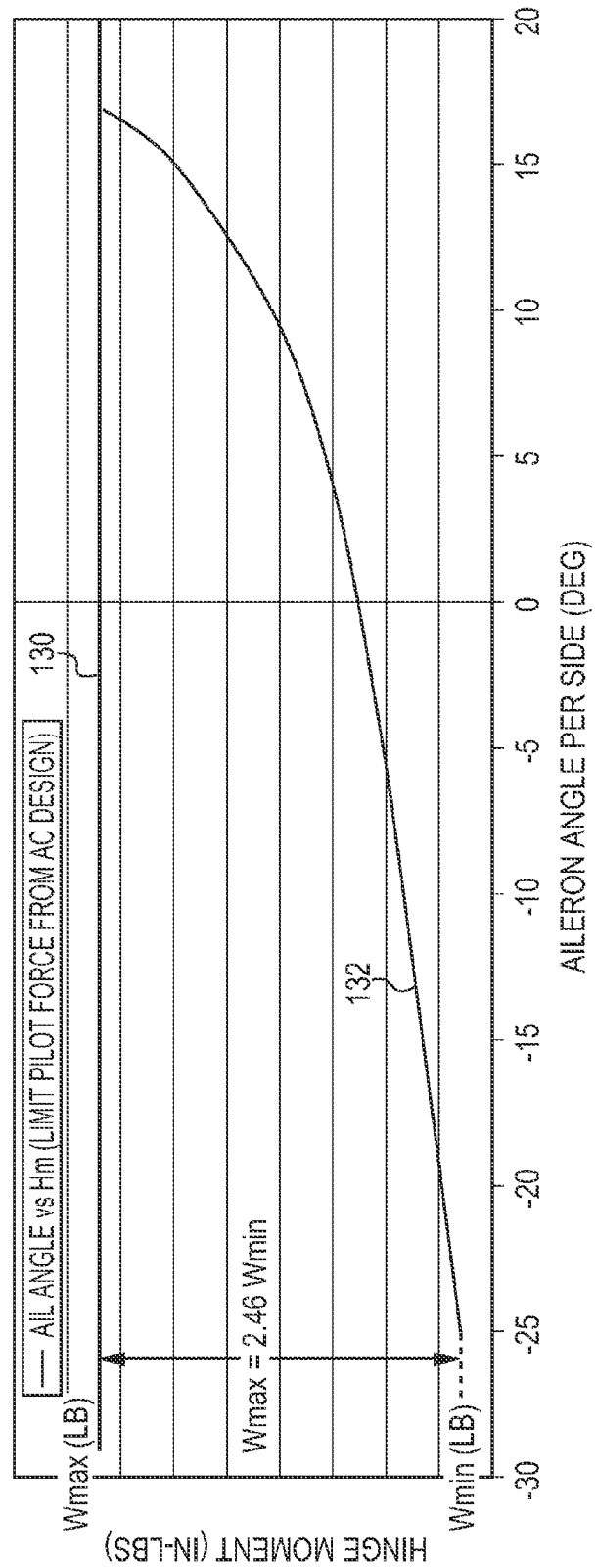
FIG. 6 shows a relationship between aileron angle and hinge moment using a traditional loading method.

Line 132 in FIG. 6 shows the hinge moment at each aileron angle with pilot limit load from aircraft design required by FAA (Federal Aviation Administration) regulation. According to FAA regulation, enough actual hinge moment based on limit pilot force should be applied to the flight control system throughout its travel positions. If the constant dummy weight is used for the loading test as the traditional loading test method, excessive overload is provided to almost all travel positions to show compliance with FAA regulations. Line 130 depicts the hinge moment which is applied to the aileron system using the traditional loading test method. The curve of the line 132 is different among the characteristics of the flight control systems and aircrafts. But for the example depicted in FIG. 6, the hinge moment of line 130 provides about 2.46 times of the minimum hinge moment of line 132 at around −25 degree aileron angle. Such an overload may damage the flight control system of the aircraft. This is not preferable to the structure that makes up the aileron system.

To define the profile surface 44 of the cam profile sector 40, a table shown below can be generated which shows the relationship among the aileron angle $\phi_{AIL}$, the cam angle $\theta_{CAM}$, the target moment arm $R_{CAM}$ and the target (design) hinge moment $H_M$ per one degree of aileron angle $\phi_{AIL}$. First, aileron angles $\phi_{AIL}$ are filed in the table from −31.25 degree to +20.75 degree. Next, cam angles $\theta_{CAM}$ are calculated and filled in the table based on the formulas above. In addition, target (Design) Hinge Moments $H_M$ are calculated by computer simulation for the structural system of the primary flight control system and filled in the table per one degree of aileron angle $\phi_{AIL}$. Finally, target moment arm $R_{CAM}$, which defines the profile surface 44, is calculated based on the formulas above per one degree of aileron angle $\phi_{AIL}$. Because C, the ratio $R_{DISK}/R_{SECTOR}$, is 1:4, when the aileron angle $\phi_{AIL}$ is −25° (as shown in FIG. 3), the cam angle $\theta_{CAM}$ of the cam profile sector 40 is −100°. However, in the table shown below the cam angle $\theta_{CAM}$ is 125°, in view of a margin (tolerance zone).

| $\phi_{AIL}$ (deg) | $\theta_{CAM}$ | $R_{CAM}$ | Target (Design) Hinge Moment |
|---|---|---|---|
| −31.25 | −125 | $R_{-MARGIN}$ | N/A |
| −25 | −100 | $R_{-25}$ | $HM_{-25}$ |
| −24 | −96 | $R_{-24}$ | $HM_{-24}$ |
| . | . | . | . |
| . | . | . | . |
| . | . | . | . |
| −12 | −48 | $R_{-12}$ | $HM_{-12}$ |
| . | . | . | . |
| . | . | . | . |
| . | . | . | . |
| 0 | 0 | $R_0$ | $HM_0$ |
| 1 | 4 | $R_1$ | $HM_1$ |
| . | . | . | . |
| . | . | . | . |
| . | . | . | . |
| 17 | 68 | $R_{17}$ | $HM_{17}$ |
| 20.75 | 83 | $R_{MARGIN}$ | N/A |

Figure 7:
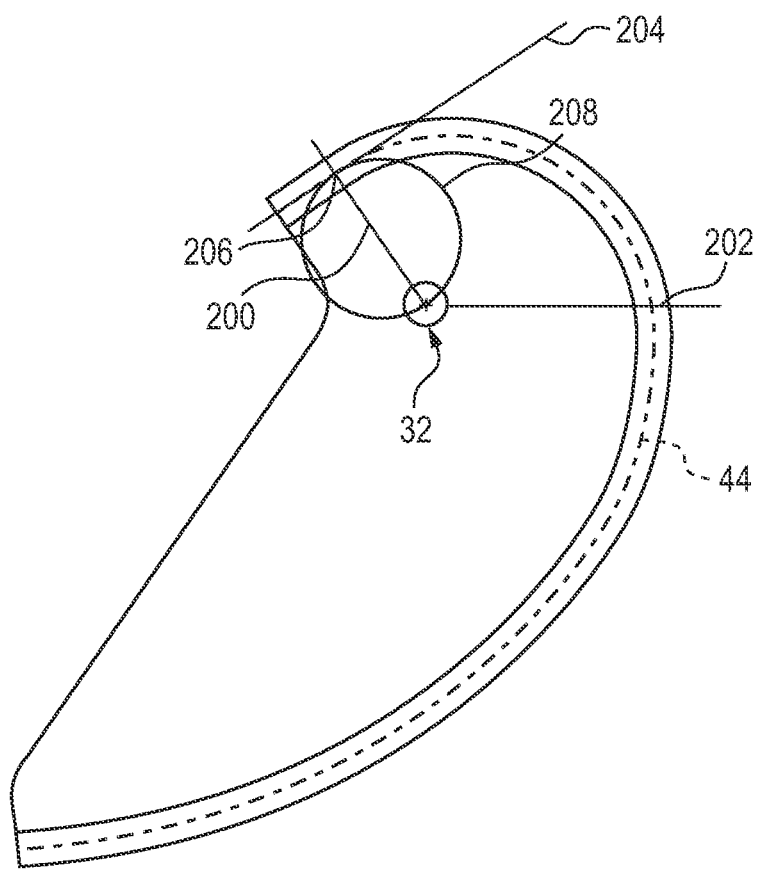
FIG. 7 is a side view of an example of a cam profile sector for the loading test apparatus of FIGS. 1 and 2.

With reference to FIG. 7, to fix the profile surface 44, a target moment arm 200 equal to $R_{-MARGIN}$ in length, based on the table above, is drawn from the rotational axis 32 of the cam profile sector 40 to −125° direction. The −125° direction is defined based on a neutral) (0°) direction 202. Next, an incircle 208 having a diameter of the target moment arm 200 is drawn. In addition, a tangent line 204 of the incircle 208 is drawn. The tangent line 204 shows the direction of the profile surface 44 at the −125° position that is an intersection point 206 of the tangent line 204 and the incircle 208. These steps are repeated for each aileron angle $\phi_{AIL}$ per one degree. A smooth line that passes through all of the intersection points can then be drawn to generate the profile surface 44. Two edges of the profile surface 44 are short straight lines as additional margins.

Figure 8:
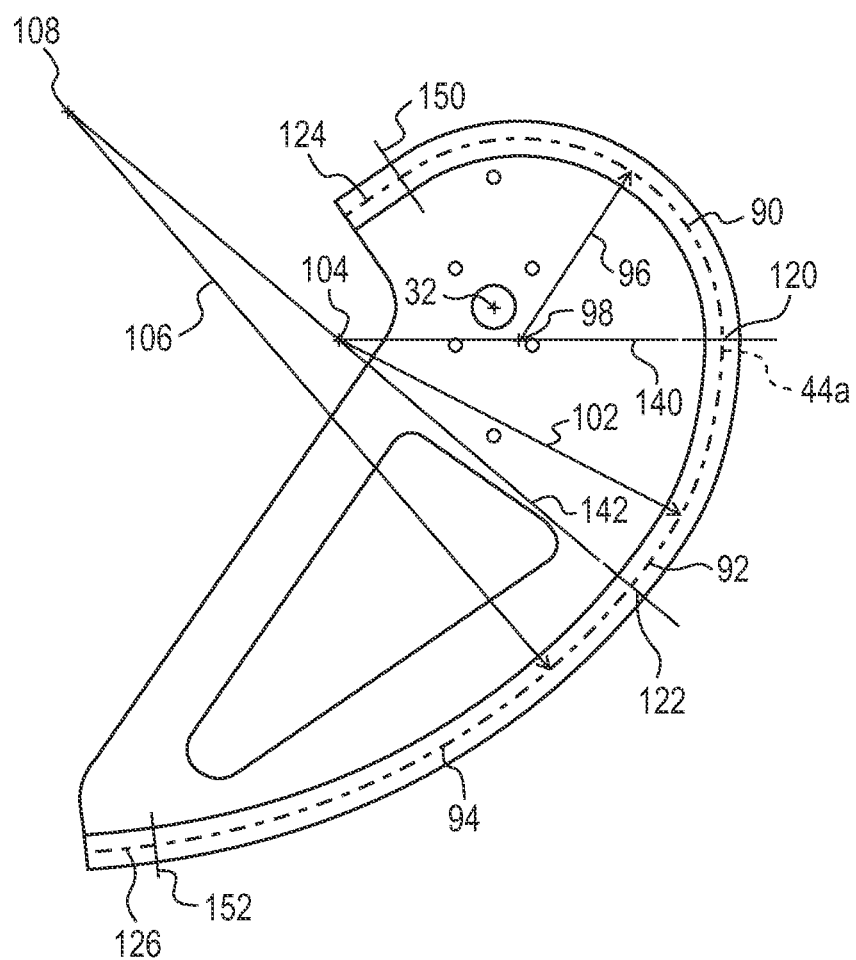
FIG. 8 is a side view of another example of a cam profile sector for the loading test apparatus depicted in FIGS. 1 and 2.

Instead of drawing an incircle for each one degree of aileron angle $\phi_{AIL}$, some incircles that represent each of the incircles mentioned above can be decided to provide a profile surface 44a in FIG. 8 that is based on the shape of the profile surface 44 in FIG. 7. Curves 90, 92 and 94, which are discussed in more detail below, are based on the profile surface of FIG. 7; however, the profile surface 44a for the cam profile sector 40 in FIG. 8 is not the profile surface 44 in FIG. 7, because the profile surface in FIG. 8 is formed of the curves 90, 92 and 94. A first incircle, which is represented by the first curve 90, is drawn to approximate the intersection points of −125° to 0° (neutral). For the profile surface 44a in FIG. 8, line 150 corresponds to −125° from a neutral position, which coincides with line 120. A perpendicular line 140 is drawn through the center (first axis 98) of the incircle represented by first curve 90 to the neutral position (line 120) on the profile surface 44a. The perpendicular line 140 is extended to fix the center (second axis 104) of a second incircle, which is represented by the second curve 92, to approximate the intersection points from 0° to 40°. The 40° position coincides with line 122 in FIG. 8. The second incircle, which is represented by the second curve 92, is then drawn. Another perpendicular line 142 is drawn through the center (second axis 104) of the second incircle from the 40° position (line 122). The perpendicular line 142 is extended to fix the center (third axis 108) of a third incircle, which is represented by the third curve 94. This third incircle is drawn to approximate the intersection points from 40° to 83°. As such, for the profile surface 44a in FIG. 8, line 152 corresponds to a position 83° from a neutral position that coincides with line 120. Of course, other curves (in addition to, or instead of, curves 90, 92 and 94) could be used depending on requirements and conditions. The number of curves should be decided appropriately based on the characteristic of the hinge moment of the aileron 72 and size of the cam profile sector 40 and the like. It has been confirmed that the profile surface 44a of FIG. 8 is enough to approximate the profile surface 44 of FIG. 7.

Referring to FIG. 8, the profile surface 44a includes or is defined by a plurality of successive curves, which are curves 90, 92, and 94 in the depicted arrangement. Each curve follows a different radius emanating from a respective axis substantially parallel to the rotational axis 32 of the cam profile sector 40. For example, the first curve 90 generally follows a first radius 96 emanating from a first axis 98, which is parallel to the rotational axis 32. As shown, the first axis 98 is distanced from the rotational axis 32. Similarly, the second curve 92 follows a second radius 102 emanating from a second axis 104, which is substantially parallel to the rotational axis 32. The second axis 104 is distanced from both the rotational axis 32 and the first axis 98. Also, the third curve 94 making up the profile surface 44a follows a third radius 106 emanating from a third axis 108, which is parallel to the rotational axis 32 of the cam profile sector 40. The third axis 108 is distanced from the rotational axis 32 and each of the first and second axes 98, 104.

A connecting point on line 120 between the first curve 90 and the second curve 92 is associated with both the first and second radii 96, 102. A connecting point on line 122 between the second curve 92 and the third curve 94 is associated with both the second and third radii 102, 106. A first end section 124 of the profile surface 44a beyond the first curve 90 is a straight line and a second end section 126 of the profile surface 44 beyond the curve 94 is also a straight line. Also, the radius 106 of the curve 94 is larger than the radius 102 of the curve 92, which is larger than the radius 96 of the curve 90.

The dummy weight 60 provides a load (hinge moment) onto the aileron 72. The cable 62 is configured to contact the cam profile sector 40 along the profile surface 44 (FIG. 7). A hinge moment applied to the aileron 72 using the dummy weight 60 varies as the cam profile sector 40 is rotated about the rotational axis 32. The length of the moment arm 112 (measured between the rotational axis 32 of the cam profile sector 40 and a location where the cable 62 is tangent to the profile surface 44) varies among the loading positions of the cam profile sector 40 depicted in FIGS. 3-5. The length of the moment arm 112 at FIG. 3 is 0.4 L of the length L of the moment arm 112 at FIG. 5. The length of the moment arm 112 at FIG. 4 is 0.6 L of the length L of the moment arm 112 at FIG. 5.

With reference to FIG. 3, the surface-mounted sector 70 and the cam profile sector 40 are each configured and operatively engaged in such a manner that the moment arm 112 is smallest when the surface-mounted sector 70 is positioned to simulate a maximum upward aileron angle, e.g., up (or minus) 25 degrees angle shown in FIG. 3. With reference to FIG. 5, the surface-mounted sector 70 and the cam profile sector 40 are each configured and operatively engaged in such a manner that the moment arm 112 is greatest when the surface-mounted sector 70 is positioned to simulate a maximum downward aileron angle, e.g., down 17 degrees angle shown in FIG. 5.

To test a hinge moment of the aileron 72, the surface-mounted sector 70 is attached to the aileron 72 such that the surface-mounted sector 70 pivots along with the aileron 72 as the aileron 72 pivots about the pivot axis 80 among a plurality of aileron angle positions (or through a range of aileron angle positions). The cam profile sector 40 is operatively connected with the surface-mounted sector 70 such that pivoting of the surface-mounted sector 70 results in rotation of the cam profile sector 40 (and vice versa) about the rotational axis 32 through a plurality of loading positions (or range of loading positions). The dummy weight 60 is attached to the cam profile sector 40 via the cable 62 such that a different length moment arm 112 is defined between the rotational axis 32 of the cam profile sector 40 and the downward force applied by the dummy weight 60 for each loading position among the plurality of loading positions (or throughout a range of loading positions) for the cam profile sector 40. For example, as seen when comparing FIGS. 3-5, the length of the moment arm 112 is different for each loading position of the cam profile sector 40.

The cam profile sector 40 is positioned in a respective loading position (or the aileron 72 is positioned at a desired aileron angle position) such that the dummy weight 60 applies a desired hinge moment on the aileron 72 at the aileron angle position.

The cam profile sector 40 could be repositioned to another respective loading position (or the aileron 72 repositioned to another desired aileron position)—without changing the dummy weight 60—resulting in another desired hinge moment. For example, when comparing FIG. 3 to FIG. 4, the position of the cam profile sector 40 (and the position of the aileron 72) is changed from FIG. 3 to FIG. 4. The dummy weight 60, however, is not changed. Nevertheless, the desired hinge moment is applied to the aileron 72 because the profile surface 44 of cam profile sector 40 changes position from the position shown in FIG. 3 to the position shown in FIG. 4. The dummy weight 60 is attached to the cam profile sector 40 such that the cable 62 rides along and contacts the profile surface 44 of the cam profile sector 40 as the cam profile sector 40 rotates about the rotational axis 32. As mentioned above, the profile surface 44 and 44a includes a plurality of curves, e.g., curves 90, 92, 94. Each curve can follow a different radius emanating from a respective axis substantially parallel to the rotational axis 32, which has been described in more detail above. As also described above, the cam profile sector 40 can be operatively connected to the surface-mounted sector 70 such that one rotation of the surface-mounted sector 70 would result in x rotations of the cam profile sector 40, wherein x is a constant greater than one, and x is four in this embodiment.

Figure 9:
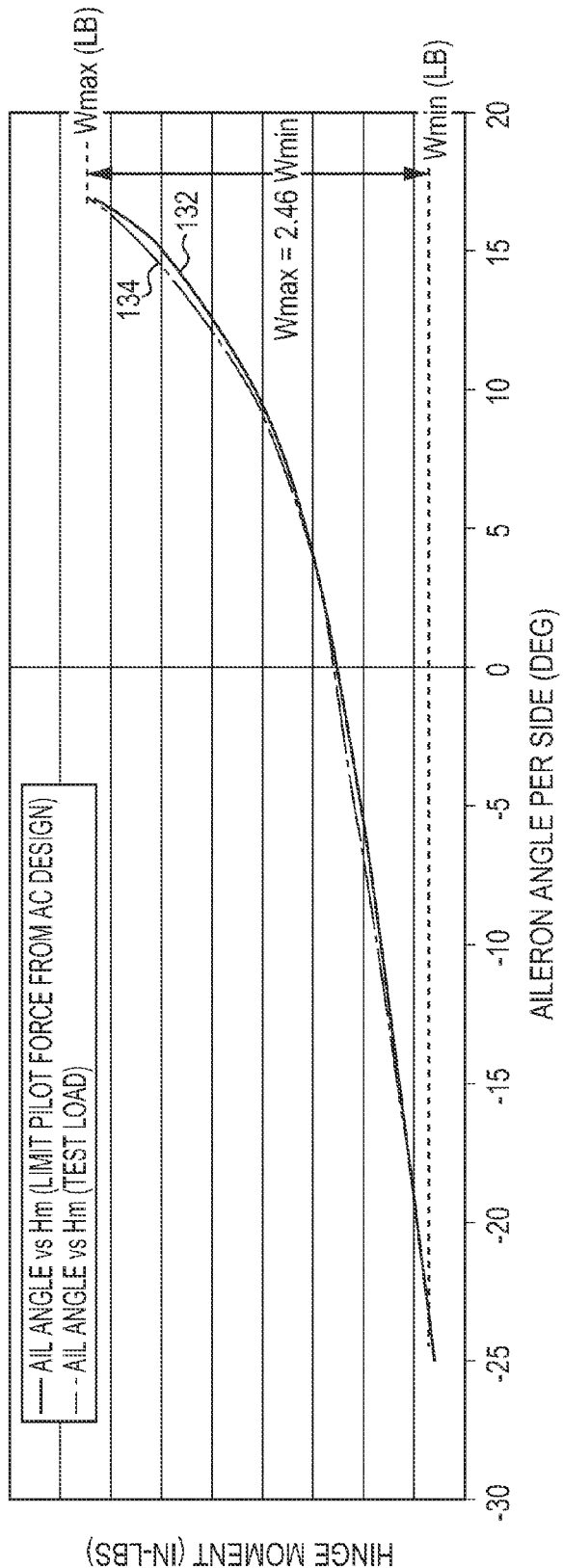
FIG. 9 shows a relationship between aileron angle and hinge moment using the loading test apparatus shown in FIG. 1.

FIG. 9 shows a relationship between the aileron angle and the hinge moment using the loading test apparatus 10 shown in FIG. 1. Line 132 from FIG. 6, which depicts the actual hinge moment in relation the aileron angle, is also shown in FIG. 9. Line 134 in FIG. 9 depicts the hinge moment provided to the aileron system by use of the loading test apparatus 10. As shown in FIG. 9, a slightly larger hinge moment is applied to the aileron system throughout all its travel positions. That is, the use of the loading test apparatus 10 almost replicates the actual hinge moment by the limit pilot force throughout the angles of the aileron 72. Therefore, this loading test method does not damage the flight control system.

A flight control system loading test apparatus, a method for testing a hinge moment of a flight control system body of an aircraft and a method for defining a profile shape of the cam profile sector of a flight control system loading test apparatus have been described above with particularity. The invention is applicable not only for testing ailerons, but can also be used with other primary flight control systems, such as an elevator and rudder. The plural curves of the profile surface can be defined appropriately according to the target hinge moment. Modifications and alternations will occur to those upon reading and understanding the preceding detailed description. The invention, however, is not limited to only the embodiments described above. Moreover, the methods described above need not be performed with the aforementioned loading test apparatus. Instead, the invention is broadly defined by the appended claims and the equivalents thereof. Also various presently unforeseen or unanticipated alternatives, modifications, variations or improvements therein may be subsequently made by those skilled in the art which are also intended to be encompassed by the following claims.

The invention claimed is:

1. A flight control system loading test apparatus comprising:
   a surface-mounted sector for attaching to a flight control system body of an aircraft such that the surface-mounted sector pivots along with the flight control system body about a pivot axis as the flight control system body pivots about the pivot axis among a plurality of flight control system angles, the surface-mounted sector having a profile surface following a radius emanating from the pivot axis;
   a cam profile sector operatively connected to the surface-mounted sector and configured to rotate about a rotational axis among a plurality of loading positions as the flight control system body pivots among the plurality of flight control system angles, the cam profile sector having a profile surface including a plurality of successive curves, each curve following a different radius emanating from a respective axis substantially parallel to the rotational axis; and
   a cable connected with the cam profile sector and a dummy weight, the cable configured to contact the cam profile sector along the profile surface such that a hinge moment applied to the flight control system body using the dummy weight varies among the plurality of loading positions to approximate a pre-calculated actual hinge moment associated with the flight control system at each of the flight control system angles.

2. The apparatus of claim 1, wherein a target moment arm of the cam profile sector is defined by the radius of the surface-mounted sector, the weight of the dummy weight and a target hinge moment at each of the flight control system angles.

3. The apparatus of claim 2, wherein the surface-mounted sector and the cam profile sector are each configured and operatively engaged in such a manner that the moment arm is smallest when the surface-mounted sector is in a position associated with a maximum upward angle of the flight control system angles.

4. The apparatus of claim 2, wherein the surface-mounted sector and the cam profile sector are each configured and operatively engaged in such a manner that the moment arm is greatest when the surface-mounted sector is in a position associated with a maximum downward angle of the flight control system angles.

5. The apparatus of claim 1, wherein the surface-mounted sector has a profile surface following a radius emanating from the pivot axis, the profile surface dimensioned such that one rotation of the surface-mounted sector results in x rotations of the cam profile sector, wherein x is a constant greater than 1.

6. The apparatus of claim 5, wherein x=4.

7. The apparatus of claim 1, further comprising a drive shaft connected with the cam profile sector, a disk connected with the drive shaft for rotation with the drive shaft and the cam profile sector about the rotational axis, and an additional cable connecting the surface-mounted sector with the disk.

8. The apparatus of claim 7, wherein the profile surface of the surface-mounted sector is dimensioned such that one rotation of the surface-mounted sector results in x rotations of the disk and the cam profile sector, wherein x is a constant greater than 1.

9. A method for testing a hinge moment of a flight control system body of an aircraft, the method comprising:
 attaching a surface-mounted sector to the flight control system body such that the surface-mounted sector pivots along with the flight control system body about a pivot axis as the flight control system body pivots about the pivot axis through a plurality of flight control system body angle positions, the surface-mounted sector having a profile surface following a radius emanating from the pivot axis;
 operatively connecting a cam profile sector to the surface-mounted sector such that pivoting of the surface-mounted sector results in rotation of the cam profile sector about a rotational axis through a plurality of loading positions;
 attaching a dummy weight to the cam profile sector via a cable such that a different length moment arm is generated between the rotational axis of the cam profile sector and a downward force applied by the dummy weight for each loading position among the plurality of loading positions; and
 positioning the cam profile sector in a respective loading position among the plurality of loading positions or positioning the flight control system body at a desired flight control system body angle position among the plurality of flight control system body angle positions such that the dummy weight applies a desired hinge moment on the flight control system body at a desired flight control system body angle position.

10. The method of claim 9, wherein the desired hinge moment substantially equals the actual hinge moment of the flight control system body at the desired flight control system body angle position.

11. The method of claim 9, further comprising repositioning the cam profile sector to another respective loading position or repositioning the flight control system body at another desired flight control system body angle position without changing the dummy weight, resulting in another desired hinge moment.

12. The method of claim 11, wherein repositioning the cam profile sector alters the flight control system body angle position and repositioning the flight control system body angle position alters the cam profile loading position.

13. The method of claim 12, wherein the desired hinge moment substantially equals the actual hinge moment of the flight control system body for each flight control system body position during repositioning of the cam profile sector.

14. The method of claim 9, wherein operatively connecting the cam profile sector to the surface-mounted sector further includes connecting the cam profile sector to the surface-mounted sector such that one rotation of the surface-mounted sector results in x rotations of the cam profile sector, wherein x is a constant greater than 1.

15. The method of claim 9, wherein attaching the dummy weight to the cam profile sector further includes attaching the cable such that the cable rides along and contacts a profile surface of the cam profile sector as the cam profile sector rotates about the rotational axis.

16. The method of claim 13, wherein the profile surface includes a plurality of curves, wherein each curve follows a different radius emanating from a respective axis substantially parallel to the rotational axis.

* * * * *